Mar. 27, 1923.
G. W. HART
1,449,817
SHOCK ABSORBING COUPLING
Filed Mar. 8, 1921
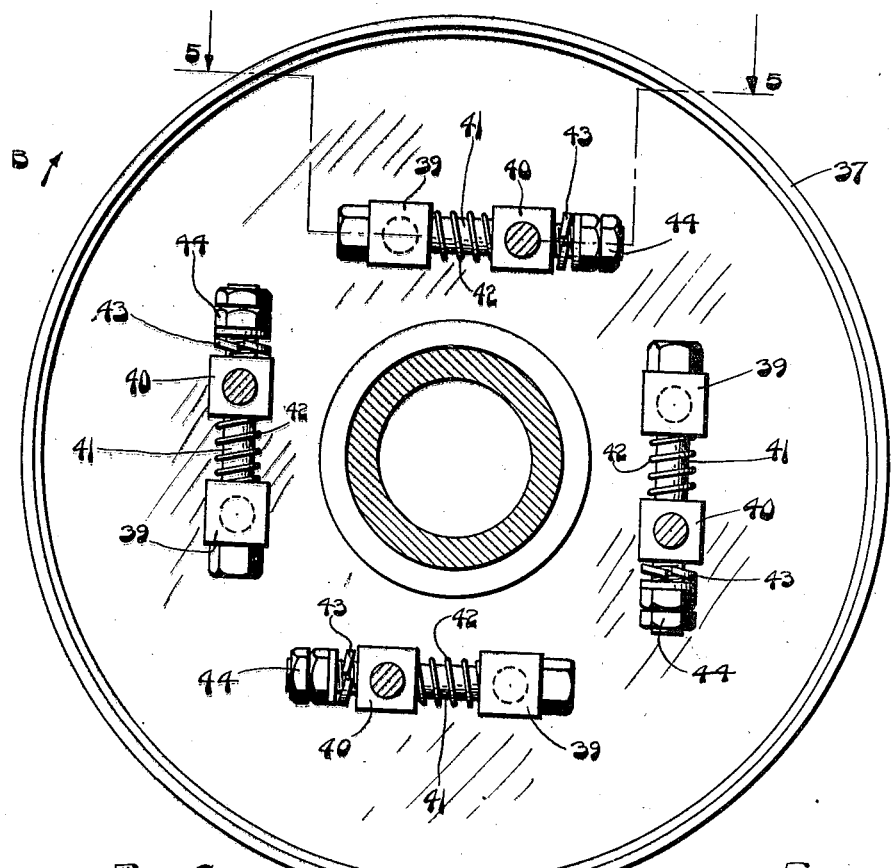
Fig. 1.
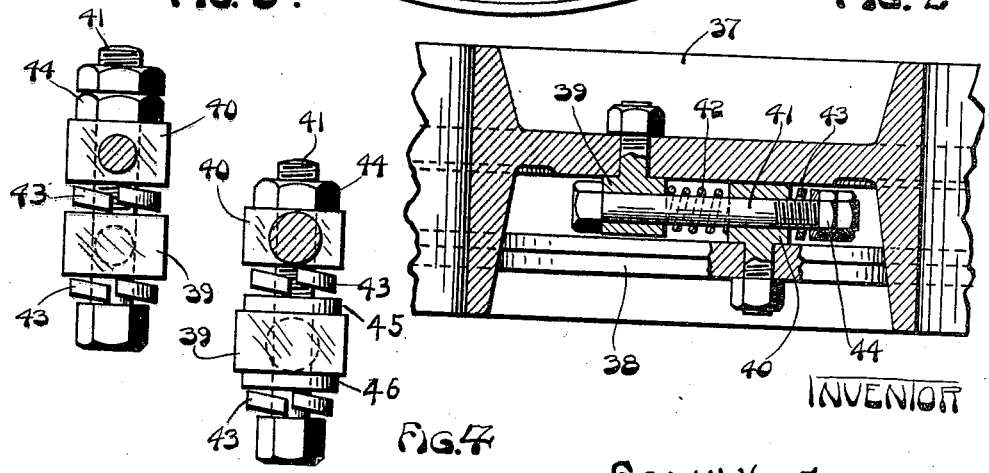
Fig. 3.   Fig. 2.
Fig. 4.
INVENTOR
Geo. W. Hart Patented Mar. 27, 1923.

1,449,817

UNITED STATES PATENT OFFICE.

GEORGE W. HART, OF CINCINNATI, OHIO, ASSIGNOR OF ONE-HALF TO GEORGE A. MOHR, OF CINCINNATI, OHIO.

SHOCK-ABSORBING COUPLING.

Application filed March 8, 1921. Serial No. 450,675.

*To all whom it may concern:*

Be it known that I, GEORGE W. HART, a citizen of the United States, residing in Cincinnati, in the county of Hamilton and State of Ohio, have invented new and useful Improvements in a Shock-Absorbing Coupling, of which the following is a specification.

This invention relates particularly to a shock absorbing coupling for shafts, pulleys and the like, wherein an object has been to produce a coupling which is simple and reliable, cheap to manufacture, easy to install, small and compact, and in which shocks are absorbed when transmitted from either direction of rotation.

These and other objects are attained in the coupling described in the following specification and illustrated in the accompanying drawings in which:

Fig. 1 is a sectional elevation of the coupling embodying my invention.

Fig. 2 is a fragmental sectional view taken on the broken line 5—5 of Fig. 1.

Figs. 3 and 4 are views of modified forms of details of my invention.

In Figs. 1 and 2 I have provided a driving member 37 with a cooperating driven member 38, between which the elements embodying the modified form of my invention are located. As I have shown, I preferably secure a block 39 to the web of the driving member and a cooperating block 40 to the driven member. Slidingly mounted in these blocks and connecting them loosely is a bolt or loose connecting link 41, a spring 42 being located on the bolt between the adjacent faces of the blocks and a spring washer 43 between the block 40 and the lock nuts 44 of the bolt. The device I have just described is a unit and may be duplicated, as for example in the drawing where I have shown four of them. The action of the above coupling is to cause blocks 39 to move toward blocks 40 under the yielding tension of springs 42 when member 37 is rotated in the direction of arrow B in Fig. 1, thus causing blocks 40 to transmit the driving impulse yieldingly to member 38. Any back lash is readily absorbed by the washers 43 when the bolts are brought into tension.

In Figs. 3 and 4 spring washers are used solely, the coiled spring 42 having been eliminated and spring washers 43 substituted therefor. In Fig. 4 additional washers 45 and 46 are used as backings for the spring washers, this feature in no way changing the operation of the device.

Having thus described my invention what I claim is:

A shock absorbing coupling consisting of a series of blocks pivoted on one of a pair of rotating members, spaced apart and alternating with a series of blocks pivoted on the other member, a loose link connecting adjacent blocks and having headed ends beyond the blocks, a spring on the link between the blocks, and an auxiliary spring on the link between a block and headed end.

In witness whereof, I affix my signature in the presence of two witnesses.

GEO. W. HART.

Witnesses:
GEO. A. MOHR,
ROBT. B. HOOPER.